T. N. HAYDEN.
AUTOMOBILE WHEEL.
APPLICATION FILED NOV. 12, 1910.
990,867.
Patented May 2, 1911.
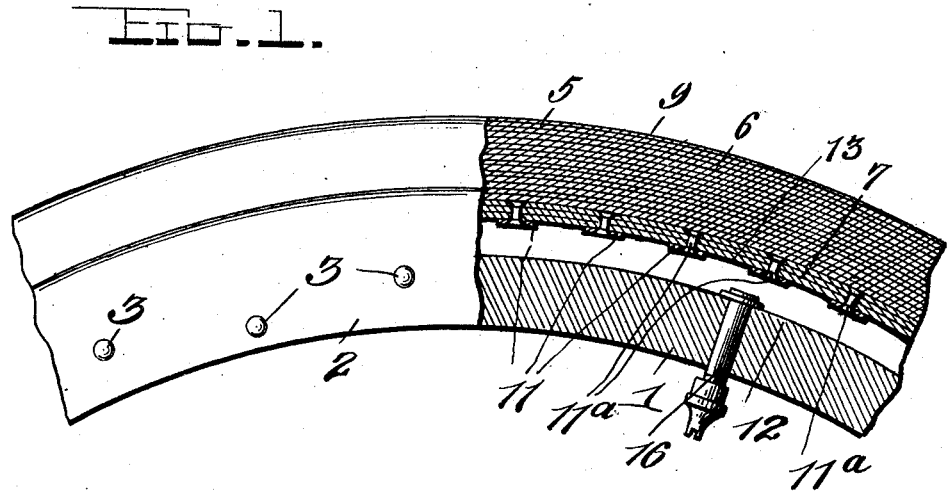
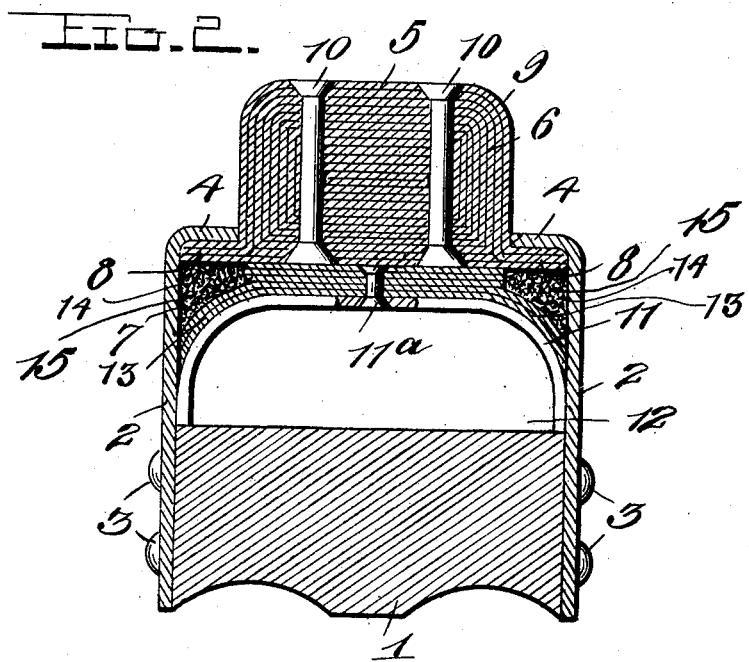
Witnesses
Chas. L. Griesbauer.
H. F. McDuay
Inventor
T. N. Hayden,
By Watson E. Coleman,
Attorney
THE NORRIS PETERS CO., WASHINGTON, D. C.

UNITED STATES PATENT OFFICE.

THOMAS NEWTON HAYDEN, OF HOLLY, COLORADO.

AUTOMOBILE-WHEEL.

990,867. Specification of Letters Patent. Patented May 2, 1911.

Application filed November 12, 1910. Serial No. 592,086.

*To all whom it may concern:*

Be it known that I, THOMAS N. HAYDEN, a citizen of the United States, residing at Holly, in the county of Prowers and State of Colorado, have invented certain new and useful Improvements in Automobile-Wheels, of which the following is a specification, reference being had to the accompanying drawings.

This invention is an improved wheel for use on automobiles and other vehicles, the object of the invention being to effect improvements in the construction of the wheel and of the tire whereby the wheel is cushioned without the necessity of employing a pneumatic or other inflatable and collapsible tire, and whereby the serious objections to the use of such devices is obviated, the invention consisting in the construction, combination and arrangement of parts, hereinafter described and claimed.

In the accompanying drawings—Figure 1 is partly an elevation and partly a sectional view of a portion of an automobile wheel constructed in accordance with my invention. Fig. 2 is a transverse sectional view of the same.

In accordance with my invention, the felly 1 of the wheel is provided with annular side plates 2, which are secured thereto on opposite sides thereof as by means of bolts 3 and project beyond the periphery of the felly so, as to form an annular circumferential channel on the periphery of the felly or rim. The said plates are preferably made of steel and their outer edges are turned inwardly toward each other so as to form peripheral flanges 4.

The tire 5 comprises an outer member 6 and an inner member 7 both of which are annular in form and are made of fabric such as cotton folded or rolled solidly. The outer member 6 is provided on its inner side with base flanges 8 which project from opposite sides thereof, and engage the inner sides of the flanges 4, the width of the main portion of the tire member 6 being such as to enable the same to fit in the space between the said flanges so that the said main portion of the tire projects outwardly from the side plates 2. The said outer member is provided with a cover 9 of any suitable material. The flanges 8 at the base of the said member 6 are formed of some of the same cotton cloth or other fabric which is employed to construct the said member. The various folds or plies of the fabric or cloth constituting the outer member 6 of the tire are secured together by rivets 10. The inner member 7 of the tire is also made of cotton or other suitable fabric or cloth folded solidly and the same is saturated with oil or a suitable lubricant.

On the inner side of the inner tire member 7, is a flexible annulus 13 which in practice comprises a number of folds of cotton or other suitable fabric. The said annulus bears at its side edges against the side plates 2 of the wheel rim. On the inner side of the flexible annulus are springs 11 which extend transversely thereof, and are secured at their centers to the flexible annulus and to the inner tire member 7, as by means of rivets 11$^a$. The ends of the springs bear against the inner surfaces of the side plates 2, of the wheel rim. It will be observed by reference to the drawings that a chamber 12 is formed in the channel in the periphery of the wheel rim, in which chamber, the inner member 7 of the tire, the base flanges 8 of the tire, the flexible annulus 13, and the springs 11 operate, and the said chamber is also filled with fluid such as air under compression. The width of the inner tire member 7 is less than that of the flexible annulus 13 so that chambers 14 are formed between the side walls of the channel, the base flanges 8, the side edges of the inner tire 7, and the flexible annulus, which chambers are filled with a packing 15 of absorbent fabric saturated with oil or other suitable lubricant. This packing owing to its being saturated with lubricant keeps the inner sides of the side plates 2 lubricated and prevents them from rusting. Moreover, the flexible annulus and the base flanges of the tire also become saturated with the lubricant and are thereby prevented from rotting. Moreover, the packing coacts with the flexible annulus and with the base flanges of the outer member of the tire, to prevent the escape of the compressed air from the peripheral chamber 12 of the wheel rim.

It will be understood that the tire may be readily manufactured at a comparatively slight cost, and that when the outer member of the tire becomes worn, it can be readily removed and repaired or replaced at sight cost. The inner tire member can also be removed and repaired or replaced at slight cost, but this will require to be done only at long intervals because by reason of its construction it is disposed on the inner side of the outer tire member, and its being saturated with oil or lubricant, the said inner tire member is exceedingly durable.

While I have herein shown and described a preferred embodiment of my invention, I would have it understood that modifications may be made within the scope of the appended claims.

I claim:—

1. In combination with a wheel rim having a peripheral channel, the side walls of which are provided with inturned stop flanges, a tire movable radially in said channel, and spaced from the bottom thereof, the said tire projecting outwardly and spaced between the said stop flanges, having broadened base flanges at the inner sides of said stop flanges, disposed within the said channel, and being further provided with an inner tire member, and a flexible annulus disposed on the inner side of the said inner tire, and bearing against the side walls of the channel, the width of the inner tire member being less than that of said flexible annulus so that chambers are formed between the side walls of the channel, the said base flanges, the side edges of the inner tire, and the said flexible annulus, and packing lubricant in the said chambers, the space between the said annulus and the bottom of the channel in the wheel rim providing a chamber for the reception of a cushioning fluid.

2. In combination with a wheel rim having a peripheral channel, the side walls of which are provided with inturned stop flanges, a tire projecting outwardly and spaced between said stop flanges, and having broadened base flanges at the inner sides of said stop flanges disposed within the said channel, an inner tire member, springs in the said channel, and a flexible annulus disposed between the inner side of the said inner tire, and the outer sides of said springs, and bearing at its side edges against the side walls of the said channel, whereby chambers for the reception of a packing lubricant are formed between the side walls of the channel, the said base flanges, the side edges of the inner tire, and the said flexible annulus.

In testimony whereof I hereunto affix my signature in the presence of two witnesses.

THOMAS NEWTON HAYDEN.

Witnesses:
G. W. STEVENS,
WALTER CREEN.

---

Copies of this patent may be obtained for five cents each, by addressing the "Commissioner of Patents, Washington, D. C."